United States Patent
Peterson et al.

[15] 3,652,297
[45] Mar. 28, 1972

[54] FLAVOR-STABLE MUSTARD

[72] Inventors: Marvin A. Peterson, Park Ridge; Gerald A. Flint, Chicago, both of Ill.

[73] Assignee: Beatrice Foods Co., Chicago, Ill.

[22] Filed: July 10, 1970

[21] Appl. No.: 54,002

[52] U.S. Cl. ................................................99/140 R, 99/144
[51] Int. Cl. .................................................A23l 1/22
[58] Field of Search ..........................................99/140, 144

[56] References Cited

UNITED STATES PATENTS 2,827,452  3/1958  Schlenk et al..........................99/140 X

FOREIGN PATENTS OR APPLICATIONS 734,382  7/1955  Great Britain............................99/140
986,119  3/1965  Great Britain............................99/140

Primary Examiner—Morris O. Wolk
Assistant Examiner—Warren R. Bovee
Attorney—Cushman, Darby & Cushman

[57] ABSTRACT

A flavor-stable mustard composition is provided by dispersing an encapsulated isothiocyanic acid ester in an oil phase and emulsifying the oil phase in an aqueous medium.

11 Claims, No Drawings

FLAVOR-STABLE MUSTARD

The present invention relates to mustard flavored compositions of increased stability and to processes for production thereof. More particularly, the present invention relates to mustard flavored compositions which may be stored for extended periods of time without significant loss of the customary hot, mustard flavor.

As is known in the art, the characteristic mustard flavor results from isothiocyanic acid esters which may be produced either naturally or synthetically. These esters are generally lower alkyl or lower alkenyl esters of the isothiocyanic acid, and especially those esters which contain up to about 10 carbon atoms, e.g., up to about six carbon atoms, such as the allyl, amyl, butyl (secondary butyl), ethyl and methyl esters. These isothiocyanate esters produce a pungent flavor and are referred to in the art as the "heat" of a mustard flavored composition. Accordingly, that terminology will therefore by employed in the present specification.

As is well known in the art, various mustard seeds yield varying degrees of "heat" when processed to produce a mustard flavor. The mustard flavor may be produced naturally by enzymatic action of certain enzymes, such as myrosinase and sinigrinase, on the glucoside sinigrin, after the mustard seed has been crushed and moistened. This natural process produces a mustard flavor in which the "heat" is mainly allyl isothiocyanate and this naturally produced ester is the main "-heat" content of conventional mustard flavored compositions. Accordingly, the invention will be described with particular reference to allyl isothiocyanate.

Also, as is well known in the art, these esters and especially allyl isothiocyanate are unstable in many mediums, and especially in an aqueous medium. Since many mustard flavored compositions contain water, the isothiocyanate ester, e.g., allyl isothiocyanate, will react with the water and produce reaction products which do not have the characteristic pungent mustard flavor. In other words, the allyl isothiocyanate decomposes in the presence of moisture and loses the "heat" flavor thereof. This reaction of allyl isothiocyanate in water begins immediately after the formation and/or introduction of allyl isothiocyanate in water and can be detected analytically after about 30 days storage at room temperature. Also, after about 30 days storage at room temperature, a taste change in mustard flavored compositions is quite noticeable. In hot mustard flavored compositions, as opposed to milder flavored mustard compositions, this change is exceptionally noticeable after about 30 days.

It would be, of course, most desirable to protect the "heat" flavor, e.g., the isothiocyanate esters, from decomposition and loss of pungent flavor and various attempts in this direction have been made in the art. A significant attempt in this direction is disclosed in British Pat. No. 734,382 to Lewis, published on July 27, 1955. The above background and problem with mustard flavored compositions are noted in that patent and it was proposed to mitigate the loss of "heat," due to decomposition in the presence of water, by dissolving the isothiocyanate esters in a fat, such as a vegetable oil, and thereafter emulsifying the fat in the aqueous medium used in preparing mustard flavored condiments. The object, of course, was that of preventing the allyl isothiocyanate from contacting water and the resulting decomposition, as noted above, by protecting the esters with the fat.

While this approach appeared promising in theory, the practice of the invention was never fully satisfactory and the resulting increase in flavor stability of so-prepared mustard flavored compositions was not as great as desired. While not being bound by theory, it is believed that since the isothiocyanate esters were dissolved in the emulsified fat droplets and therefore evenly distributed throughout the fat droplets, the esters were also present at the surface of the fat droplets and thereby contacted the aqueous phase of the mustard flavored composition, thereby decomposing in a manner heretofore recognized by the art. Gradually, it appears, after decomposition of some of the isothiocyanate esters, additional isothiocyanate esters would migrate to the surface of the fat droplets (in the natural manner of a solute in a solvent), and likewise be decomposed. Accordingly, the promise of the approach disclosed in the British patent was never completely realized and the loss of "heat" from such compositions disclosed therein still remained serious.

Accordingly, it would be desirable and is an object of the present invention to obviate the difficulties noted in connection with the invention of the British patent and to produce a mustard flavored composition which can be stored for extended periods of time without significant loss of "heat" flavor.

It is a further object to provide processes for producing such compositions.

Briefly stated, the present invention resides in the discovery that the problems associated with the invention of the British patent, as noted above, could be either completely obviated or substantially mitigated when the isothiocyanate esters, as defined above, are encapsulated or coated with a fat-insoluble coating and dispersed in fat droplets, which droplets are thereafter emulsified in an aqueous medium. Hence, instead of dissolving the esters in fat droplets, as proposed by the British patent, the esters are coated (i.e., encapsulated or enrobed) in an edible, fat-insoluble material and these discrete powdered particles of coated or encapsulated esters are dispersed in the emulsified fat phase of the mustard flavored composition.

With the present invention, the esters are macroscopically dispersed in the fat phase, rather than submacroscopically dissolved in the fat phase. This difference, however, substantially mitigates or prevents decomposition of the "heat" in a mustard flavored composition, as compared with the invention of the British patent. Since the present compositions are much more stable, a small amount of the ester can be in the oil phase and still present a pungent flavor even after long storage. However, usually the amount of encapsulated ester dispersed in the oil phase will be at least 0.01 percent of the oil phase, but may be up to 50 percent of the oil phase. The oil phase and/or aqueous phase may have mustard flour therein, if desired, to provide part of the mustard flavor and/or color and consistence, especially when a mustard spread is desired. Generally, the weight ratio of mustard flour to isothiocyanate ester is from 0.01:1 to 250:1.

As can be appreciated from the above, the particular coating agent is not important so long as it is an edible, fat-insoluble encapsulating or enrobing agent which is a solid at room temperature. If these requirements are met, the material is acceptable. Many such encapsulating or enrobing agents are well known to the art and it is not necessary to set forth all of those agents herein. However, by way of example and illustration, the encapsulating or enrobing agent may suitably be a polysaccharide such as natural gum. For example, a carbohydrate gum such as gum arabic, gum ghatti, gum karaya, gum tragacanth, alginic acid and salts thereof, guar gum, pectin agar and carageenan. Or there may be used locust bean gum, quince seed gum, milk derivatives such as sodium caseinate, dextrins, starches, modified starches, gelatin, methyl cellulose, hydroxymethyl cellulose, and carboxymethyl cellulose.

Similarly, the esters may be coated by any conventional means many of which are known to the art, but it is preferred that the esters be coated by spray-drying techniques, since these techniques are well known to the art and produce, generally, uniformly coated particles. An example of a typical technique is as follows. An emulsion in water of 35 to 40 percent by weight of solids of gum acacia and allyl isothiocyanate is prepared. The weight ratio of gum to ester is 80:20. The emulsion is spray dried in a conventional tower having an inlet temperature of 200° to 320° F. and an outlet of about 100° F. A free flowing enrobed powder of allyl isothiocyanate in gum acacia is produced. While the ratio of encapsulating or enrobing agent to the isothiocyanate ester encapsulated or enrobed thereby may vary widely, it is preferred that the coating agent be rather thickly applied. Preferably the proportion of enrobing or encapsulating agent to the ester coated thereby is at least 30:70, especially 50:50 and most suitably about 80:20, by weight.

The particular fat in which the coated esters are dispersed is not important so long as it is emulsifiable, either as a solid or a liquid, at room temperature and is edible.

The fat is most preferably an oil at room temperature, i.e., a liquid at room temperature. However, for purposes of the present specification the term "oil" is intended to embrace fats generally, whether liquid at room temperature or not, e.g., cocoa butter. Any oil may be used, either a vegetable oil, an animal or fish oil, or a synthetic oil, e.g., hard butters. However, vegetable oils are preferred, especially from an economic point of view, and suitable vegetable oils include cottonseed oil, soybean oil, sunflower oil, nut oils, corn oil, coconut oil, olive oil, palm kernel oil and safflower oil.

It is also desirable that appropriate emulsifying agents, stabilizers, coloring agents, salt, other flavoring agents, etc., be incorporated in the mustard flavored compositions, as is well known in the art. Any of the well-known edible emulsifiers and stabilizers may be used. However, the invention may be practiced without emulsifiers or stabilizers and the composition can be homogenized by mechanical action, e.g., a homogenizer machine. Ordinarily, however, mechanical homogenization will not form a sufficiently stable emulsion which will allow the emulsion to be stored for extended periods of time. Accordingly, it is preferred that stabilizers and emulsifiers be used. In this regard, any of the conventional stabilizers and emulsifiers such as polyglycerol partial esters of fatty acids, e.g., diglycerol to triconto (30 glycerol units) glycerol esters of higher fatty acids. Of the polyglycerol esters the preferred are triglycerol to decaglycerol partial esters of high fatty acids, e.g., containing 12 to 22 carbon atoms in the fatty acid. Examples of suitable polyglycerol esters are triglycerol monostearate, triglycerol mono ester of the acids of cottonseed oil, triglycerol monooleate, hexaglycerol monostearate, hexaglycerol mono shortening, hexaglycerol monooleate, hexaglycerol dioleate, hexaglycerol hexaoleate, decaglycerol monostearate, decaglycerol monooleate, decaglycerol mono laurate, decaglycerol tristearate, decaglycerol trioleate, decaglycerol tri linoleate, decaglycerol decastearate, decaglycerol decaoleate, decaglycerol deca linoleate, decaglycerol tetraoleate, diglycerol monostearate, dodecaglycerol hexapalmitate, decaglycerol tripalmitate, decaglycerol diarachinate, triglycerol mono behenate, dodecaglycerol trilignocerate, decaglycerol mono linoleate, hexaglycerol diricinoleate, decaglycerol deca myristate, decaglycerol triester of soybean oil acids, decaglycerol tetra ester of cottonseed oil acids, hexaglycerol mono ester of coconut oil acids, triglycerol mono ester of peanut oil acids, decaglycerol deca ester of corn oil acids, decaglycerol ester deca ester of hydrogenated cottonseed oil acids. Another preferred class is propylene glycol monostearate, butylene glycol monostearate, propylene glycol mono palmitate, butylene glycol mono palmitate, propylene glycol monooleate, butylene glycol monooleate, glycerol lacto monooleate, glycerol lacto monopalmitate, glycerol lacto monostearate, dipropylene glycol monostearate. There can also be used mono and diglycerides or triglycerides. These glycerides are primarily glycerol stearates although some palmitate is normally also present. Of course, mixtures of any of the foregoing stabilizers and emulsifiers may be used. Particularly suitable mixtures can comprise sorbitan monostearate and polyoxyethylene sorbitan monostearate, the polyglycerols and soft mono and diglycerides, glycerol monostearate and polyoxyethylene sorbitan monostearate, glycerol lacto palmitate and soft mono and diglycerides or glycerol monostearate and soft mono and diglycerides.

While the present invention is applicable to any mustard flavored food product including salad dressings, mayonnaise, sauces, etc., the invention is most useful, of course, for preparing a mustard spread. Accordingly, the invention will be illustrated in connection with the preparation of creamed mustard spread, although the invention is fully applicable to the extent noted above. In the Examples, all parts and percentages are by weight unless otherwise noted.

EXAMPLE 1

Into a kettle is added 39.65 parts of water and 0.25 part of Kelcoloid LV (sodium alginate) which has been wetted with 1 part of cottonseed oil to aid in dispersing and solution of the Kelcoloid LV. This mixture is agitated to dissolve the Kelcoloid LV, and if desired mild heating, e.g., up to about 120° F., may be used to speed up the dissolving of the Kelcoloid LV. After the Kelcoloid LV is dissolved, 0.05 part of polysorbate 60 (polyethylene (20) sorbitan monostearate), 23 parts of mustard flour, 4.5 parts of salt and 0.1 part of potassium sorbate are added to the mixture and heated with stirring until dissolved, e.g., to about 180° F.

In a second kettle, 5 parts of cottonseed oil is added with stirring to 0.5 part of particles of allyl isothiocyanate encapsulated in gum arabic (80:20 ratio of gum to ester). One part of Atmos 300 (glycerol monooleate) is added. The average particle size of the encapsulated allyl isothiocyanate is small and constitutes a free flowing powder. The cottonseed oil, particles of encapsulated allyl isothiocyanate and Atmos 300 are agitated to suspend the particles of encapsulated allyl isothiocyanate and preheated to about 155° F.

The contents of the second kettle are slowly added with stirring and heating to the contents of the first kettle. An emulsion of the contents of the second kettle is therefore prepared in the water solution of the first kettle and the particles of encapsulated allyl isothiocyanate are dispersed within the emulsified cottonseed oil phase. Twenty-five parts of 100 grain (10 percent acidity) white vinegar is slowly added with stirring, which makes a total of 100 parts of composition (all parts being by weight). If desired, the vinegar may be preheated up to near the boiling point thereof. The mixture is pasteurized at 160° F. for at least 5 minutes, or the pasteurization at any conventional time and temperature, packaged and cooled to produce a creamed mustard spread of excellent taste and of pungent flavor.

The composition was stored at room temperature and in the packaged condition for 6 months. After this period of time, there is little loss of pungent flavor ("heat") of the mustard composition, and the actual loss of pungent flavor is far less than that lost by a conventional mustard composition under the same conditions.

It should be noted that in order to prepare the present compositions, it is important that the particles of encapsulated allyl isothiocyanate be dispersed in the oil prior to the oil being mixed with the aqueous portion of the mustard composition. It should also be noted that while in the above example the vinegar is added as a separate step, this is not necessary but only more convenient since it keeps the amount of liquid required to be heated and stirred in step 1 to a more easily handable amount. The temperatures noted above are not at all critical and can be from as low as room temperature up to the boiling point of the mixture, although heating is preferred since solution of the various components is facilitated thereby. Obviously, an oil-soluble or oil dispersible emulsifier must be used in this connection.

Additionally, the particular ratios and amounts of the various ingredients is not at all critical and may be varied at will as is well known in the art. The water content could be as low as 3 percent or as high as 95 percent, the mustard flour content could be as low as from none at all to as high as 60 percent, the oil content could be as low as 0.5 percent to as high as 55 percent and the proportion of encapsulated allyl isothiocyanate could be as low as 0.01 percent to as high as 40 percent. The emulsifier content can be as low as 0.01 percent and up to 10 to 15 percent.

What is claimed is:

1. In a mustard flavored composition containing an isothiocyanic acid ester dissolved in an edible oil phase and which oil phase is emulsified in an aqueous medium, the improvement comprising the said ester encapsulated in an edible, oil-insoluble enrobing agent and dispersed within the said emulsified oil phase.

2. A composition according to claim 1 wherein the encapsulated ester is a spray dried powder.

3. A composition according to claim 2 wherein the encapsulated ester constitutes at least 0.01 percent of the oil phase.

4. A composition according to claim 3 wherein the encapsulated ester is a spray dried powder and the ratio of encapsulating agent to ester is at least 30:70.

5. A composition according to claim 4 wherein the said ester is allyl isothiocyanate.

6. A composition according to claim 5 wherein the encapsulating agent is a polysaccharide and the oil is a vegetable oil.

7. A composition according to claim 6 wherein the encapsulating agent is a natural gum or dextrin and the oil is cottonseed oil, corn oil, soybean oil or coconut oil, which oil contains an emulsifier.

8. In a process for producing a mustard flavored composition by dissolving an isothiocyanic acid ester in an edible oil phase and emulsifying the oil phase in an aqueous medium, the improvement comprising encapsulating the said ester in an edible, oil-insoluble enrobing agent, dispersing the said encapsulated ester in the said oil phase and thereafter emulsifying the oil phase in an aqueous medium.

9. A process according to claim 8 wherein the ester is encapsulated by spray drying and the encapsulated ester is a powder.

10. A process according to claim 9 wherein the encapsulated ester is dispersed in the oil phase and the resulting oil phase is emulsified in an aqueous medium containing an emulsifier and stabilizer.

11. A process according to claim 10 wherein the aqueous medium contains an emulsifier.

* * * * *